(12) United States Patent
Del Sesto et al.

(10) Patent No.: US 6,530,082 B1
(45) Date of Patent: Mar. 4, 2003

(54) CONFIGURABLE MONITORING OF PROGRAM VIEWERSHIP AND USAGE OF INTERACTIVE APPLICATIONS

(75) Inventors: Eric E. Del Sesto, Alameda, CA (US); Timothy V. Travaille, Bellevue, WA (US); Christopher J. Michel, Burbank, CA (US); Jana J. Paquette, Oakland, ME (US)

(73) Assignee: Wink Communications, Inc., Alameda, CA (US)

( * ) Notice: Subject to any disclaimer, the term of this patent is extended or adjusted under 35 U.S.C. 154(b) by 0 days.

(21) Appl. No.: 09/071,003

(22) Filed: Apr. 30, 1998

(51) Int. Cl.[7] .............................. H04N 9/00; H04N 7/16

(52) U.S. Cl. .............................. 725/9; 725/131; 725/14

(58) Field of Search ................................. 725/9, 20, 16, 725/32, 34, 100, 131, 139, 151, 14; 709/224, 310; 713/2; H04N 9/00, 7/16, 7/10, 7/025, 7/173; G06F 15/173, 15/163, 9/00, 9/54, 9/445

(56) References Cited

U.S. PATENT DOCUMENTS

| | | |
|---|---|---|
| 4,484,217 A | 11/1984 | Block et al. |
| 4,536,791 A | 8/1985 | Campbell et al. |
| 4,592,546 A | 6/1986 | Fascenda et al. |
| 4,658,290 A | 4/1987 | McKenna et al. |
| 4,706,121 A | 11/1987 | Young |
| 4,745,468 A | 5/1988 | Von Kohorn |
| 4,876,592 A | 10/1989 | Von Kohorn |
| 4,926,255 A | 5/1990 | Von Kohorn |
| 4,965,825 A | 10/1990 | Harvey et al. |

(List continued on next page.)

OTHER PUBLICATIONS

S. Wolf and B. Latane; If Laboratory Research Doesn't Square with You, then Qube It: The Potential of Interactive TV for Social Psychological Research; Personality and Social Psychology Bulletin, vol. 7, No. 2, Jun. 1981; pp. 344–351.*

Primary Examiner—Andrew Faile
Assistant Examiner—Andrew Y Koenig
(74) Attorney, Agent, or Firm—Fenwick & West LLP

(57) ABSTRACT

A system and method provide sophisticated analysis of program viewership by executing interactive applications that generate responses describing the viewers' behavior. A broadcast server maintains a database of interactive applications each preferably associated with a program that will be broadcast. The interactive applications preferably include monitoring interactive applications that are configured to selectively monitor viewership, interactive application usage, and reception terminal usage. When the program is broadcast, the monitoring interactive application is inserted into the broadcast feed and delivered to a broadcast receiver such as a television set-top box. The broadcast receiver includes a processor, memory, and other hardware necessary to execute the interactive application. When executed, the interactive application monitors usage of the broadcast receiver, including, for example, the program watched by the subscriber, the entry and exit paths to the program, whether the volume was changed during the program, and the usage of interactive applications. The monitored data is sent in a response packet to a local data center at, for example, the cable headend. The local data center supplements the response with subscriber information from one or more subscriber databases, including marketing information such as the subscriber's age, race, and income. Information about all of the subscribers is aggregated by the local data center and transmitted to a master data center. The master data center aggregates all of the received information, supplements it if possible with additional subscriber information, and provides reports to the broadcaster indicating the geographic, demographic, and psychographic profiles of the program viewers.

29 Claims, 7 Drawing Sheets

U.S. PATENT DOCUMENTS

| | | |
|---|---|---|
| 4,977,455 A | 12/1990 | Young |
| 5,013,038 A | 5/1991 | Luxenberg et al. |
| 5,034,807 A | 7/1991 | Von Kohorn |
| 5,057,915 A | 10/1991 | Von Kohorn |
| 5,083,800 A | 1/1992 | Lockton |
| 5,120,076 A | 6/1992 | Luxenberg et al. |
| 5,128,752 A | 7/1992 | Von Kohorn |
| 5,155,591 A | 10/1992 | Wachob |
| 5,227,874 A | 7/1993 | Von Kohorn |
| 5,249,044 A | 9/1993 | Von Kohorn |
| 5,251,324 A | 10/1993 | McMullan, Jr. |
| 5,253,341 A | 10/1993 | Rozmanith et al. |
| 5,283,734 A | 2/1994 | Von Kohorn |
| 5,343,239 A | 8/1994 | Lappington et al. |
| 5,347,632 A | 9/1994 | Filepp et al. |
| 5,394,182 A | 2/1995 | Klappert et al. |
| 5,404,393 A | 4/1995 | Remillard |
| 5,422,674 A | 6/1995 | Hooper et al. |
| 5,423,555 A | 6/1995 | Kidrin |
| 5,585,866 A | 12/1996 | Miller et al. |
| 5,600,364 A * | 2/1997 | Hendricks et al. ............. 725/9 |
| 5,758,257 A * | 5/1998 | Herz et al. .................. 725/116 |
| 5,771,307 A * | 6/1998 | Lu et al. ..................... 382/116 |
| 5,798,785 A * | 8/1998 | Hendricks et al. ............ 725/46 |
| 5,801,747 A * | 9/1998 | Bedard ......................... 725/46 |
| 5,986,650 A * | 11/1999 | Ellis et al. .................. 348/327 |
| 6,286,140 B1 * | 8/2001 | Ivanyi .......................... 725/14 |
| 6,353,929 B1 * | 3/2002 | Houston ....................... 725/20 |

* cited by examiner

| | |
|---|---|
| 510 | VERSION NUMBER |
| 512 | TYPE |
| 514 | FREE MEMORY |
| 516 | SAMPLE SIZE |
| 518 | INFORMATION |
| 520 | USAGE MONITORING |
| 522 | RECEPTION TERMINAL |
| 524 | FORM VISITATION |
| 526 | APPLICATION SPECIFIC DATA |
| 528 | IA ID |
| 530 | BR ID |
| 532 | BS ID |

*FIG. 5*

Daily Form Usage

Site: WRS-ORLA.US.WINK-1.5

Channel: 36

| | | | | | |
|---|---|---|---|---|---|
| Headline News | 0 | 16 | Headline News - More Detail, Story | 1 | 23 | 45 |
| National News | 4 | 8 | National News - More Detail, Story | 1 | 23 | 45 |
| World News | 63 | 16 | World News - More Detail, Story | 1 | 23 | 45 |

*FIG. 6B*

CONFIGURABLE MONITORING OF PROGRAM VIEWERSHIP AND USAGE OF INTERACTIVE APPLICATIONS

CROSS-REFERENCE TO RELATED APPLICATIONS

The subject matter of this application is related to the subject matter of U.S. Pat. No. 5,689,799, entitled "METHOD AND APPARATUS FOR ROUTING CONFIDENTIAL INFORMATION", which issued on Nov. 18, 1997 and the following applications: application Ser. No. 08/429,064, entitled "METHOD AND APPARATUS FOR DETERMINING BROADCASTER INFORMATION", filed on Apr. 26, 1995, application Ser. No. 08/429,107, entitled "COMPACT GRAPHICAL INTERACTIVE INFORMATION SYSTEM", filed on Apr. 26, 1995, and application Ser. No. 09/070,757, entitled "RESPONSE CAPACITY MANAGEMENT IN INTERACTIVE BROADCAST SYSTEMS BY PERIODIC RECONFIGURATION OF RESPONSE PRIORITIES", filed on even date herewith. The above patent and applications have the same assignee as the present invention and are incorporated herein by reference in their entirety.

BACKGROUND

1. Field of Invention

The present invention relates generally to systems and methods for determining television and interactive application viewership and, more particularly, to systems and methods for selectively controlling the monitoring of such viewership and usage on a program specific level.

2. Background of the Invention

Commercial television programming is generally funded by advertising revenue. The determination of how much a broadcaster can charge advertisers for placing an advertisement during a given time slot in a given television show depends on knowing how many people are likely to be watching at the time the advertisement is aired. This type of viewership data, or 'rating', has normally been collected through various manual and automatic processes. Manual processes typically include a preselected number of households of viewers, and requires the viewers to manually record what television shows are being watched, at what times, and by whom. This intrusive process interferes with the viewers' watching behavior and necessarily relies on the viewers accurately reporting their television viewing behavior.

To overcome the accuracy and intrusiveness problems, automatic methods typically rely on detecting channel selection in the broadcast receiver, and recording data indicative of such selection in some memory, or transmitting data of such selection to a central repository. Various means have been used to detect channel selection behavior in broadcast receivers, such as televisions, set top boxes, and video cassette recorders. Transmitting channel selection data has typically involved transmission by secondary telephone lines, or by polling in a cable system. Signals to control monitoring times have been transmitted to broadcast receivers using telephone, microwave, radio frequency transmitters, or the cable system itself. For example, U.S. Pat. No. 5,251,324 to McMullan, Jr. et al., discloses sending information about specific recording times to a remote terminal such as a set top box directly via cable lines.

These automated systems and methods, however have various limitations. While the actual information of interest to the broadcaster is what particular television programs are being watched and when, these techniques instead focus on detecting channel selection behavior, and use this information as a proxy for the television programs being watched. This is generally because the various types of broadcast receivers typically have the capability to only tune to specific channels, and at best store very limited data indicative of the channel.

Because prior techniques attempt only to detect channel selections, they are not able to more precisely control, on an individual basis, which television programs are monitored. Further, because channel selection is the primary data being monitored, prior techniques have not addressed controlling the level of detailed information that is monitored, such as how long a particular television program is watched, which particular portions of a television show are watched, which television program was watched prior to a monitored television program, or which television program was watched after a monitored television program. This detail is typically not captured because broadcast receivers typically do not provide a platform for executing configurable monitoring applications that are associated with particular television programs.

Further, conventional monitoring methods depend on the pre-selection of a number of households that will have the monitoring equipment or capability installed. As a result, there is little, if any, ability to dynamically configure which households are included in a particular monitoring event for a particular television program.

Another limitation of conventional monitoring methods is their inapplicability to monitoring the use of interactive applications. Interactive television has been much discussed, but rarely implemented beyond very small test markets. However, truly national broadcasting of interactive applications which enhance the viewing of television programs, advertisements, and other programminng material will benefit from usage data indicating the usage rate of interactive applications. Since interactive applications may be operated in a channel independent manner, conventional channel selection monitoring methods do not accurately track usage of interactive applications.

Accordingly, it is desirable to provide a system and method for precisely monitoring the viewership of television programs and the usage of interactive applications. It is further desirable to provide a system and method that allows for dynamic configuration of which television programs and interactive applications are monitored and the level of detailed information that is captured during the monitoring period.

SUMMARY OF THE INVENTION

The present invention overcomes the limitations of conventional television viewing monitoring techniques by providing a system and method that allows for specification of individual television programs and interactive applications to be monitored, along with specific control over the level and type of detailed information to be captured during monitoring. The monitoring is silent because the viewer is not required to initiate the monitoring and need not know that monitoring is occurring. The present invention further allows the monitored data from individual televisions, set top boxes, video cassette recorders, and other broadcast receivers to be accumulated and aggregated at local and national levels, and augmented with demographic or psychographic data about the viewing audience. This augmented data provides the broadcaster with a very precise analysis of the audience viewing particular television programs or using particular interactive applications. For example, the present invention allows a broadcaster to accurately determine the percentage of households with an income over $50,000 that watched a certain commercial broadcast 15 minutes into a single episode of a particular situation comedy.

A system in accordance with the present invention includes a number of broadcast receivers, such as set top boxes, televisions, video cassette recorders, and the like, that are configured to include a microprocessor and a memory for storing and executing interactive applications. The interactive applications are broadcast with the television broadcast signal, and typically accompany television programs or advertisements, but may be independent of either.

The system also includes a broadcaster that is the source of broadcast data including television programs, commercials, and interactive applications. The broadcaster typically includes an automated broadcast selection mechanism to automatically control the selection of broadcast data according to a playlist which defines that specific sequence of broadcast data, typically including the start time, program, and channel identity of each item of data being broadcast. The broadcaster includes a data insertion unit that inserts a monitoring interactive application into a program or broadcast signal. The broadcast signal is then broadcast by a transmitter.

Communicatively coupled to the broadcaster is a broadcast server that receives from the automated broadcast selection mechanism the playlist of broadcast data. The broadcast server also maintains a database of interactive applications, including monitoring interactive applications. The various interactive applications are associated with individual broadcasters, television programs, and commercials. The broadcast server correlates particular ones of the interactive applications, and especially the monitoring interactive applications with particular broadcast data that is to be monitored. These selected monitoring interactive applications are communicated to the data insertion unit which inserts them into the broadcast signal to accompany the particular broadcast data to be monitored.

The broadcast signal containing the monitoring interactive application and the broadcast data to be monitored is received by any broadcast receiver tuned to the specific channel upon which the monitoring interactive application is broadcast. Thus only those broadcast receivers that are tuned to such channel will receive the monitoring interactive application.

However, instead of requiring monitoring at each and every broadcast receiver that so receives the broadcast signal, the monitoring interactive application includes data and algorithms which selectively control which broadcast receivers monitor viewership or usage. The monitoring algorithms of the monitoring interactive application are configurable for each individual television program, commercial, or interactive application to be monitored to adjust the sample size in response to .predicted market share, time of day, and other factors. For example, for a very popular television program watched by millions of viewers, the monitoring interactive application may be configured to create 1% sample of about 10,000 viewers. For a less popular television program with only about 100,000 viewers, the monitoring interactive application may be configured to create a 10% sample. This ability to control sample size avoids overloading the response capacity of the monitoring system and enhances the precision with which viewership data is collected.

In addition, the monitoring interactive applications may be individually configured to control the level or type of detailed information that is monitored. A basic level of monitoring is determining whether the particular television program or commercial is being watched at all. In addition, the monitoring interactive application may be configured to determine the total amount of time the program was watched, the starting and ending viewing times, the channel entry path (which channel was being watched or other event prior to the current program being monitored), the channel exit path (which channel was watched or other event, after or during, the current program being monitored), and the volume settings during the monitored program. Also, the monitoring interactive application may be configured to monitor aspects of a channel or network, such as start and ending times, and entry and exits paths.

Finally, as a further embodiment of the present invention, the monitoring applications may be configured to monitor functionality of the broadcast receiver itself, so that this information may be provided to a manufacturer of the broadcast receiver. Features of the broadcast receiver that may be monitored include, for example, whether a picture-in-picture (PIP) function is used (including size, location, and channel selection of the PIP), which video inputs are active, whether an upstream tuner is used in conjunction with the broadcast receiver, and use of features such as mute, closed-captioning, stereo surround, and so forth.

In this embodiment, the monitoring interactive applications operate invisibly to the viewers so that viewers need not manually initiate monitoring of their viewing behaviors. The monitoring interactive application may be configured to operate automatically in this fashion, or to be initiated by a viewer.

Beyond monitoring television programs and commercials, the monitoring algorithms and data may be embedded in any interactive application that provides interactive functionality to the user. Example interactive applications include applications for registering viewer feedback during a television program, applications providing sport statistics during an accompanying sports broadcast, applications providing financial data or weather information, and applications for purchasing advertised items or services. These and other types of interactive applications may include the monitoring algorithms and data and thereby be able to selectively monitor the usage of these applications along the same dimensions as mentioned above. In addition, an interactive application can report which of its forms were used, the amount of time spent on each form, the entry and exit time on each form, the entry and exit path of each form (i.e. previous and next form), and viewer channel selections during use of the interactive application. This type of precise monitoring informs the owner of the interactive application of the usage and effectiveness of the application.

The preferred system includes a number of data centers, each operating, for example, at a local cable system providing cable service to a number of broadcast receivers in a local service area. Each broadcast receiver that is monitoring transmits a response to its local data center. The response includes the monitoring data, along with an identification code for the monitoring interactive application that performed the monitoring, and an identification code of the broadcast receiver providing the response. The data center receives the responses from the various local broadcast receivers and aggregates them into an aggregate set of data. The aggregate data describes local rating and usage information for the monitored program or interactive application in various geographic areas. In addition, the data center is communicatively coupled to a database of subscriber information that is indexed by the broadcast receiver's terminal identification codes. Using the broadcast receiver identification code, the data center obtains and aggregates the subscriber information in the database, thereby providing, for example, aggregate viewership data with respect to geographic location. The data center may be further coupled to geographic, demographic and/or psychographic data collections, including such data as household income, racial classifications, interests and preferences, and the like in order to create detailed reports about viewership and usage.

The aggregated reports from various data centers are transmitted to a central data center, where they are further aggregated to reflect a regional or national level of data. The data center generates these regionally aggregated reports, and provides them to the various broadcasters.

A method of selectively monitoring broadcast data in accordance with the present invention includes receiving at a broadcast receiver an interactive application accompanying a broadcast program, executing the interactive application to selectively determine whether the broadcast program accompanying the interactive application is to be monitored, responsive to this determination, configuring the interactive application to monitor selected attributes of viewership of the broadcast program, and monitoring the selected attributes of viewership by storing data indicative of the selected attributes. As an additional step, the method includes configuring an interactive application by defining the selected attributes of a broadcast program to be monitored, storing within the interactive application data indicative of the selected attributes, and transmitting the interactive application so configured to the remote broadcast reception terminal.

BRIEF DESCRIPTION OF THE DRAWINGS

FIG. 5 is a chart illustrating an embodiment of the response packet generated by the broadcast receiver and transmitted to the local data center.

DETAILED DESCRIPTION OF THE PREFERRED EMBODIMENT

Figure 1:
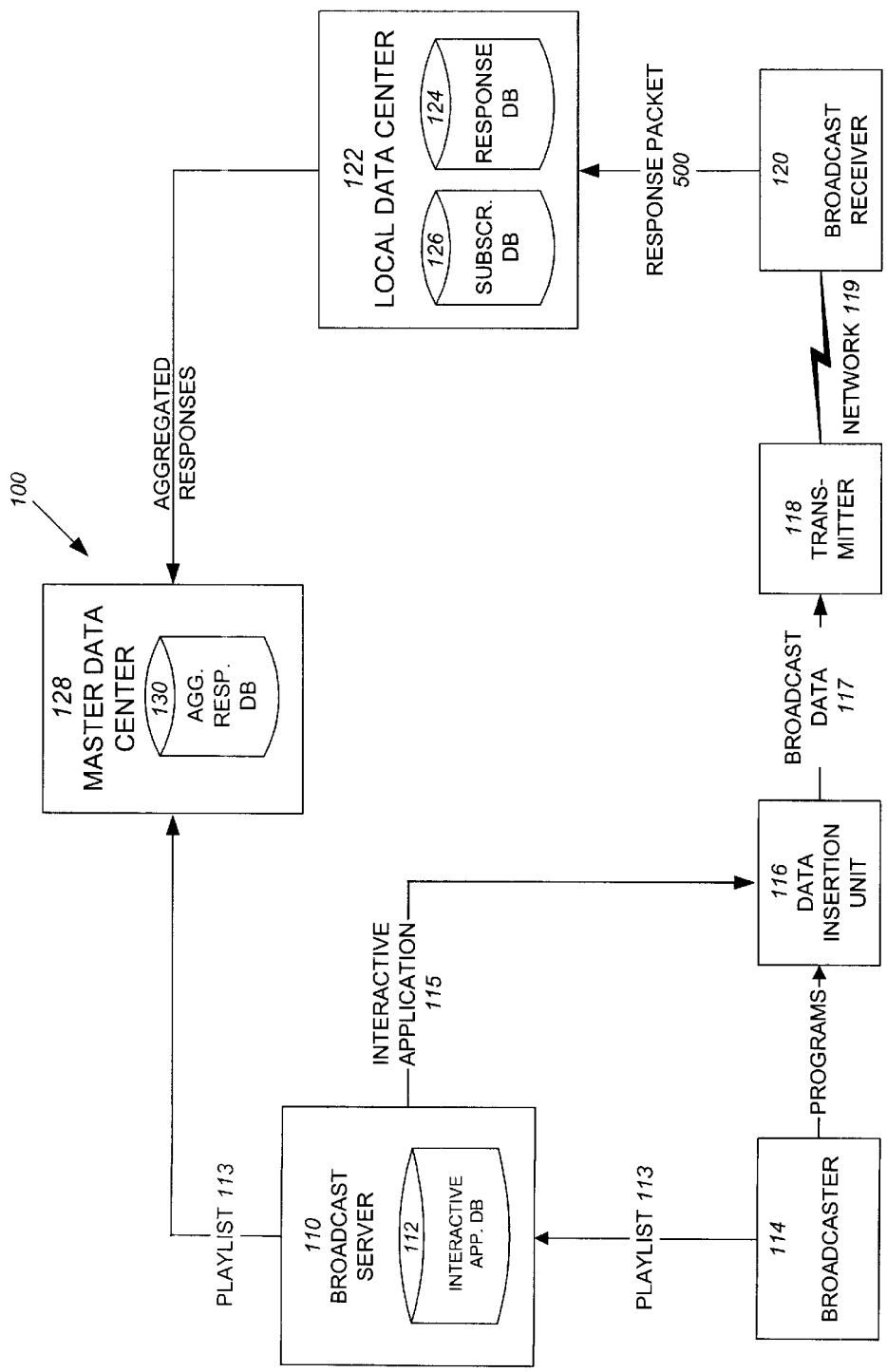
FIG. 1 is a high-level block diagram illustrating a system for performing usage and viewership monitoring according to a preferred embodiment of the present invention.

Referring now to FIG. 1, there is shown an illustration of a system in accordance with the present invention. It will be appreciated that the system illustrated in FIG. 1 may be incorporated into larger, more complex systems while still providing the features and benefits of the invention. Generally, system 100 includes a broadcaster 114, a broadcast server 110, a data insertion unit 116, and at least one broadcast receiver ("BR") 120.

The broadcaster 114 provides program material to be broadcast to the BRs 120. As used herein, a "broadcaster" 114 is any entity providing a program that will be carried on a broadcast signal. A "program" is a discrete segment of a broadcast. Thus, as defined herein, program includes television shows, commercials, public service announcements, pay-per-view events, and the like. Broadcasters include television networks, as well as advertisers who prepare commercials, pay-per-view providers, cable networks, and the like. A typical broadcaster 114 maintains program sources, such as banks of video cassette players, video disc players, film, and the like containing program material; automation systems that selectively control the program sources to select which units provide program material at which times; and switching systems controlled by the automation systems which couple the program sources to respective broadcast media for controlling which program sources output to which broadcast media at any given time. The person or persons receiving the programs are referred to as "subscribers" or "viewers."

The broadcast server 110 is preferably a computer system executing a software program providing the functionality described herein. The broadcast server 110 contains an interactive application database 112 holding interactive applications that will be broadcast to various remotely distributed BRs 120. Interactive applications may be added to the interactive applications database 112 by a broadcaster 114 or other program supplier and may be transmitted to the database 112 by a secure network link or other transmission media. Fields within the database 112 associate interactive applications with, for example, a particular broadcaster, network, channel, program, and/or broadcast time. In addition, each interactive application in the database 112 preferably has a unique interactive application identification code by which it may be identified.

In one embodiment of the present invention, the interactive applications stored in the database 112 are described by a compact communications protocol. The compact protocol is designed to broadcast a compact set of information and commands among the system components in an efficient manner, thereby allowing the use of low bandwidth transports such as the vertical blanking interval (VBI). While a preferred embodiment of the present invention uses the compact protocol described therein, interactive applications may be described by other protocols, including for example, the Hypertext Markup Language ("HTML") or SUN MICROSYSTEMS INC.'s JAVA language. A detailed description of one compact protocol for monitoring interactive applications, including supported definitions, scripts, and commands, is described in U.S. Pat. No. 5,689,799, entitled "Method and Apparatus for Routing Confidential Information," which issued on Nov. 18, 1997 and is hereby incorporated by reference herein. The interactive applications are themselves software products comprising executable code and data, which configures and controls the operation of a broadcast receiver 120, as further described below.

There may be a plurality of broadcast servers 110, with each broadcast server 110 serving a particular geographic area, set of broadcasters, or set of subscribers. In one embodiment, each broadcast server 110 is identified by a unique server identification code.

Generally, the broadcast server 110 determines which interactive applications should be broadcast on a particular channel at a particular time, retrieves the interactive applications corresponding to the particular channel and time from the database 112, and prepares the interactive applications for broadcast.

To determine which interactive applications are broadcast at the various times, channels, and so forth, the broadcast server 110 receives a playlist 113 of programs to be broadcast by the broadcaster 114. In one embodiment, this playlist 113 is prepared in advance and identifies the programs that will be broadcast by the broadcaster 114 at particular times. In another embodiment, the broadcast server 110 receives the playlist 113 in real-time, identifying the program currently being broadcast by the broadcaster 114, with the playlist 113 being updated as the broadcast changes. In either embodiment, the playlist 113 contains sufficient information to identify each program, its start and end times, the channel and network assignments, or broadcaster identification code. The broadcast server 110 uses this information to identify and retrieve a corresponding interactive application from the database 112 that is to accompany the program.

The broadcast server 110 formats a retrieved interactive application, if necessary, and otherwise prepares it for insertion into a broadcast signal. Using the playlist 113 received from the broadcaster 114, the broadcast server 110 passes the interactive application 115 to the data insertion unit ("DIU") 116 to incorporate the interactive application 115 into the broadcast feed concurrent with the broadcast of the program.

The DIU 116 receives the interactive application 115 from the broadcast server 114 and the broadcast signal, or feed, carrying the program corresponding to the interactive application 115. The broadcast feed may be received from the broadcaster 114, or, in the case where the broadcaster does not provide the feed, from a third party such as a network, cable operator, or local television station. The DIU 116 converts the interactive application 115 into a format suitable for insertion into the broadcaster feed and transmission therewith as broadcast data 117. The DIU 116 may receive feeds from multiple broadcasters and can insert a separate interactive application into each feed. Likewise, the DIU 116 can simultaneously insert a separate interactive application into multiple channels from the same, or different, broadcasters 114.

The DIU 116 inserts the broadcast data 117 containing the interactive applications and broadcast programs into the broadcast medium. The broadcast medium is the frequency spectrum used to carry the interactive application 115. In one embodiment, the broadcast medium is a standard analog television signal following National Television Standards Committee ("NTSC") standards and the VBI is used as a transport to broadcast the interactive application 115. The transport is the specific portion of the broadcast medium which carries the interactive application 115. In another embodiment, the broadcast medium is a standard MPEG2 Digital Video Multiplex containing one or more MPEG2 Video Services, and an MPEG2 elementary stream (or streams) within this multiplex is used as a transport.

In one embodiment, the DIU 116 uses conventional methods to insert data defining an interactive application into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 115 separately from the television program. Such transport mechanisms include out-of-band transmitters, which transmit the interactive application 115 on an unused portion of the television frequency spectrum, and conventional frequency modulation ("FM") radio transmitters, which transmit the interactive application 115 outside the television frequency spectrum. In another embodiment, the DIU 116 uses conventional methods to insert data into an elementary stream within an MPEG2 multiplex.

In one embodiment, error checking or error correcting codes such as Hamming codes are inserted with the broadcast data. In one embodiment, the DIU 116 translates the data into a Hamming code, and in another embodiment, the data received by the DIU 116 from the broadcast server 114 is already encoded.

The DIU 116 is coupled to a transmitter 118 for transmitting the broadcast data 117, including the inserted interactive application. In one embodiment, the transmitter 118 is a satellite uplink transmitting the data 117 to local uplink receivers which then distribute the data 117 to the BRs 120 via cable. In another embodiment, the transmitter 118 is a conventional cable system head-end amplifier. In yet other embodiments, the transmitter 118 is a conventional television broadcast transmitter or a high-definition television digital transmitter.

In another embodiment, the DIU 116 inserts the interactive application 115 into the program before the program is broadcast. For example, the DIU 116 may insert an interactive application into the source copy of a television commercial. Accordingly, the interactive application is broadcast whenever the commercial is broadcast. In this embodiment, the broadcast server 110 does not need to synchronize the retrieval of the interactive application with the schedule listed in the playlist.

Regardless of transmission method and insertion time, the broadcast data 117 is received by a subscriber's BR 120. Although only a single BR 120 is illustrated in FIG. 1, it is understood that in a typical embodiment there are hundreds or thousands of BRs 120 receiving the broadcast data 117 and responding as described herein. In a typical embodiment, the BR 120 is a television set-top box receiving the data via a coaxial cable. Additionally, the BR 120 may be integrated into the television. Moreover, other broadcast receivers, including a NTSC broadcast receiver, a high-definition television digital receiver, a video cassette recorder, or a FM radio receiver can also be used.

Figure 2:
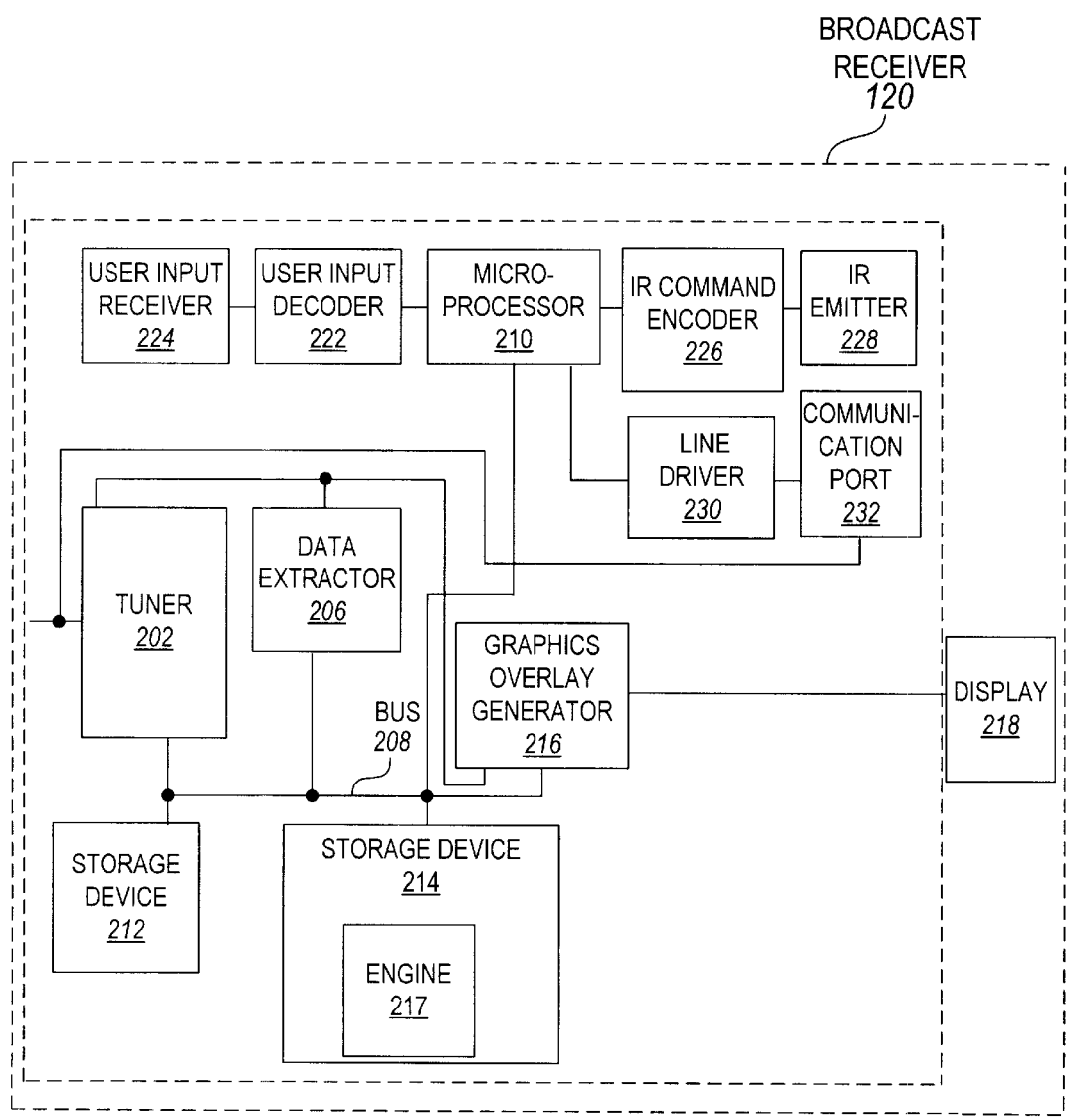
FIG. 2 is a block diagram illustrating an embodiment of a broadcast receiver according to an embodiment of the present invention.

FIG. 2 illustrates an embodiment of the BR 120 according to an embodiment of the present invention. In one embodiment, the BR 120 is the General Instrument CFT-2200 CATV set-top decoder. The BR 120 includes a tuner 202 for receiving the broadcast data 117 from the transmitter 118. In one embodiment, the tuner 202 is a conventional cable television tuner. In other embodiments, the tuner is a television broadcast tuner, a FM radio tuner, a digital tuner, or some other form of tuner. The embodiment illustrated in FIG. 2 shows a display 218, typically a television, within the BR 120. As mentioned above, the display 218 may also be located external to the BR 1200.

The BR 120 also includes a data extractor 206 coupled to the tuner 202 for extracting the interactive application from the broadcast data 117. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208. The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM").

Other memory types, such as a flash memory which is readable and writeable yet retains its contents after a power loss, may be substituted for the second storage device 214. An advantage of flash memory is that software or data resident in the BR 120 can be modified by a received interactive application.

In one embodiment, the BR 120 also uses the data extractor 206 to extract a time signal from the broadcast data 117. The time signal indicates the current time using a standard timebase, such as Coordinated Universal Time ("UTC") or the subscriber's local time. In another embodiment, the BR 120 has a real-time clock that is either set by the subscriber or the received time signal. Regardless, the BR 120 preferably has access to the current time and, accordingly, can perform date stamping and timing functions.

As described below, the microprocessor 210 uses the program stored in the second storage device 214 and the interactive application stored in the first storage device 212 to execute the interactive application and provide an output. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif.

The output from executing an interactive application may be, for example, a form presenting information or a menu to a television viewer or for receiving viewer input, or it may be a response, silent or otherwise, containing BR 120 or television usage data or indicating viewer preferences. To this end, the BR 120 preferably includes a graphics overlay generator 216 coupled to the bus 208 and driven by the interactive application 115 stored in the first storage device 212 and the program stored in the second storage device 214. The graphics overlay generator 216 generates a graphical display responsive to the interactive application 115. This graphical display is displayed on a display 218, typically a television, coupled to the BR 120. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 115, for example, to input data into a displayed form. In one embodiment, the microprocessor 210 is also coupled to a user input decoder 222 coupled to a user input receiver 224 to allow the user to communicate with the microprocessor 210 in order to respond to the interactive application 115. In one embodiment, the user input decoder 222 is a conventional infrared remote control decoder. The user input receiver 224 is preferably a conventional infrared receiver 224 with which the user may use a conventional hand held remote control device. Remote control keys pressed by the user translate to coded infrared signals that are received by the user input receiver 224, are decoded by the user input decoder 222, and sent to the microprocessor 210 to allow the user to communicate with the interactive application 115. The microprocessor 210 may also be coupled to a conventional infrared command encoder 226, which accepts an infrared command input and encodes a signal for a conventional infrared emitter 228 to allow the interactive application 115 to control external devices.

Returning to FIG. 1, the interactive application 115 executing on the BR 120 preferably gathers data and transmits it to a local data center ("LDC") 122 for processing. This data may be, for example, viewer responses to on-screen forms generated by the interactive application 115, or information silently collected by the interactive application 115 without notifying the viewer. A data line driver 230 within the BR 120 accepts data from the first storage device 212 under the direction of the microprocessor 210 and sends it to a communications port 232 to allow the microprocessor 210 to send return data to the LDC 122. In one embodiment of the present invention, usually when the BR 120 is within a set-top box, the cable coupled to the BR 120 is a two-way communications medium. Accordingly, the LDC 122 may be located at the cable headend and the data line driver 230 transmits the data from the communications port 232 to the LDC 122 via an out-of-band frequency in the cable. In an alternative embodiment, usually when the BR 120 is integrated within a television, the BR 120 is directly connected to the LDC 122 by, for example, a telephone line. Accordingly, the data line driver 230 is a conventional modem and the communications port 232 is a conventional RJ-11 telephone jack. Although only a single LDC 122 is illustrated in FIG. 1, a typical embodiment will have multiple LDCs, each located at a separate cable headend and receiving responses generated by BRs coupled to that headend.

In one embodiment, the BR 120 stores a plurality of responses in the first storage device 212 and forwards data to the LDC 122 upon the occurrence of a trigger, such as the number of stored responses exceeding a predetermined limit, the first storage device 212 becoming full, or the expiration of a timer. Alternatively, the BR 120 may forward responses to the LDC 122 at particular time intervals, in response to a poll from the LDC 122, an interactive application 115, or another device, or at a rate determined by the interactive application 115 that generated the response.

Each BR 120 preferably has a unique terminal identification code that is included in the response and allows the LDC 122 to identify each responding BR 120. In addition, the BR 120 also preferably includes the interactive application and broadcast server identification codes in the response, although the latter identification can typically be inferred from the terminal identification code.

The LDC 122 is preferably a computer system executing a software program providing the functionality described herein. The LDC 122 stores the responses in a response database 124. By using the terminal identification code, the LDC 122 can cross-reference responses in the response database 124 with subscriber information stored in a subscriber information database 126. The subscriber information database 126, in one embodiment, is the same database as is used for subscriber billing. In addition, the database preferably contains information about the subscribers useful for marketing purposes, such as the subscribers' household income, age, race, interests, preferences and the like. In an alternative embodiment, the additional marketing information is stored in a separate database accessible by the terminal identification code or other information contained in the subscriber information database 126. The data in the subscriber information database 126 are aggregated with the responses in the response database 124.

The aggregated data are preferably transmitted from the LDC 122 to a master data center ("MDC") 128. The MDC 128 is also preferably a computer system executing a software program providing the functionality described herein. The MDC 128 holds the aggregated responses in an aggregate response database 130. In addition, the MDC 128 preferably receives a playlist 113 from the broadcast server 110, the broadcaster 114, or another source, that allows it to correlate responses with broadcast programs.

Figure 3:
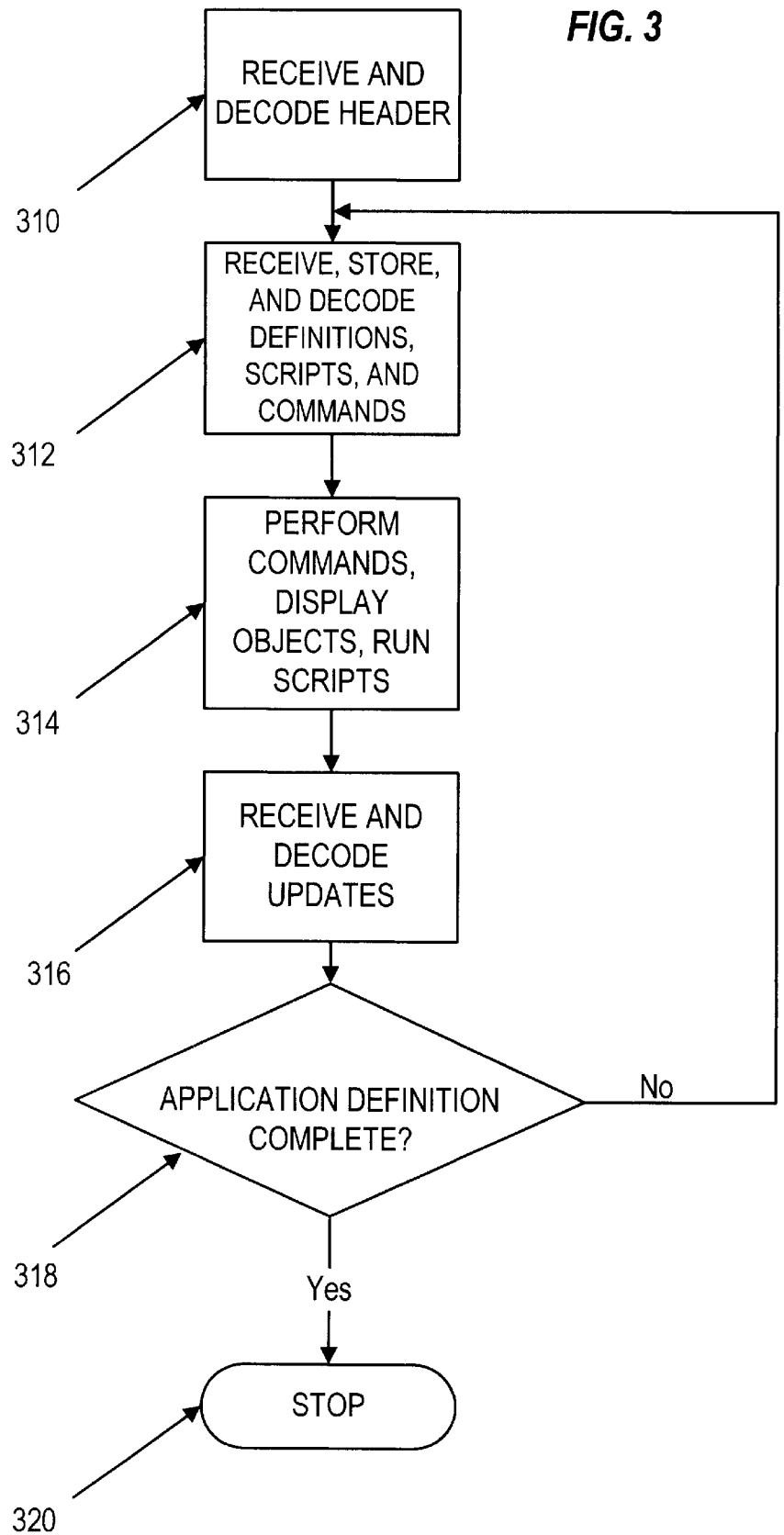
FIG. 3 is a flow chart illustrating steps for receiving and operating an interactive application according to an embodiment of the present invention.

FIG. 3 is a flow chart illustrating steps for receiving and operating a monitoring interactive application 115 using the compact information protocol according to a preferred embodiment of the present invention. The BR 120 receives and decodes 310 an application header record prepared by the broadcast server 110, inserted by the DIU 116, and transmitted by the transmitter 118. The application header record describes the information that follows and contains the interactive application identification code.

The monitoring functionality of the interactive application 115 is described by definitions, scripts, and commands which may be encoded and broadcast in any order. The definitions, scripts, and commands are received and decoded 312 by the BR 120 and define the monitoring and response parameters used when executing 314 the monitoring interactive application 115. Information that can be tracked by the application includes viewership of a specific broadcast, channel, or network, usage of other specific interactive applications, and usage of functionality provided by the BR 120 such as picture-in-picture.

Some or all of the received monitoring interactive application 115 may be stored 312 within the BR 120. In one embodiment, the interactive application 115 is repeatedly broadcast, allowing a BR 120 to tune to a program at any time yet receive the entire interactive application 115. Any desired updates to the stored interactive application 115 may be received and decoded 316. If there are additional or updated definitions, scripts, or commands, they may be sent until the application is complete 318. In one embodiment, a termination command may be broadcast to stop 320 the interactive application 115 from monitoring.

A new interactive application may be sent at any time, including while an original application is monitoring or transmitting a response. For example, a new interactive application corresponding to a commercial may interrupt an original application corresponding to a news program, the latter application can resume operation upon termination of the former. As part of this functionality, in one embodiment a suspend application command is sent by the new application in order to suspend operation of the original application, and a resume application command may be sent by either application to terminate the new application and resume operation of the original application.

Figure 4:
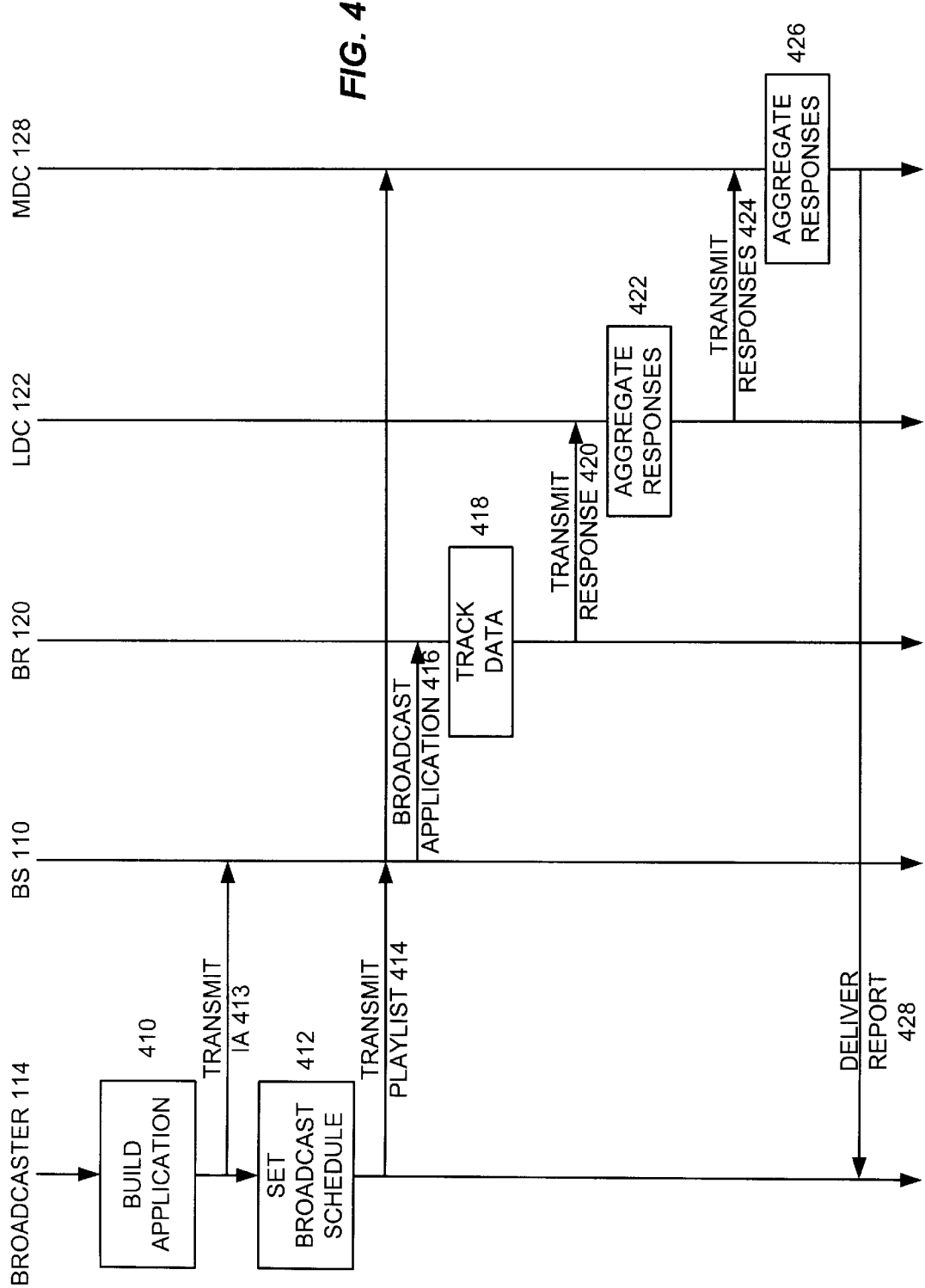
FIG. 4 is an event diagram tracing the construction, transmission, and execution of an interactive application for monitoring, and the processing of responses generated therefrom.

FIG. 4 is a event diagram tracing the construction, transmission, and execution of an interactive application 115 for tracking and processing responses generated therefrom according to an embodiment of the present invention. In FIG. 4, time flows from top to bottom, items in boxes represent actions performed by the entity listed above the column containing the box, and arrows connecting the entities represent data exchange between them.

First, the broadcaster 114 builds 410 the interactive application. When building the application, the broadcaster 114 decides how to monitor usage and viewership information. In short, an interactive application may monitor this information silently, silently under subscriber control, or explicitly. An interactive application that silently monitors information does not provide any indication to the subscriber that information is being tracked or responses transmitted. An interactive application that collects information silently but under subscriber control, in contrast, is first activated by a subscriber, but does not indicate when or what information is collected. Finally, an interactive application that explicitly monitors information provides feedback to the subscriber indicating that information has been collected. An explicit interactive application may execute, for example, when a subscriber responds to a survey or purchases a product via a form displayed by the BR 120.

The broadcaster 114 also decides on what type of information to collect. The present invention enables monitoring of three types of information: program viewership, interactive application usage, and BR 120 usage. Program viewership information includes: whether a program, channel, or network was viewed, the amount of time it was viewed, the viewing start and end time, the viewer's entry and exit paths, whether the viewer "channel surfed" (i.e., tuned away from the channel and then returned to it after a brief time), and ancillary information such as volume settings or changes.

The broadcaster 114 may also wish to track information about the BR 120. For example, a television manufacturer may want to know how often features of a television set are used. BR 120 usage information includes how often a picture-in-picture feature is used, which video inputs are used, what channel the BR's tuner is on, and whether mute, close-captioning, or stereo surround sound is activated, and any other user-selectable features of the BR 120.

In situations where the interactive application is not silent and is explicitly activated by a viewer, the broadcaster 114 may desire to track use of the interactive application in order to fine-tune or optimize it. Information tracked in such circumstances may include whether the application was launched, what forms of the application were displayed, the time spent at each form, the entry and exit times for the forms, and the entry and exit paths for the forms. For example, monitoring capabilities may be incorporated into a sports interactive application that allows for viewer participation while viewing a sporting event, so that the broadcaster 114 can determine which features or forms are most heavily used.

Functionality for collecting these various items of information is coded into the interactive application 115 using the compact protocol described above. The actions performed by the BR 120 to collect this information are described below.

When building the interactive application 115, the broadcaster 114 also accounts for the bandwidth of the broadcast medium. The bandwidth available in the VBI for broadcasting the interactive application 115 is inherently limited. Likewise, the bandwidth for the responses may be limited, depending upon how responses are transmitted and collected. Accordingly, the broadcaster 114 can control various parameters that affect the transmission of the interactive application 115 and the generation and collection of responses.

Such response parameters may, for example, configure an interactive application to collect responses only from those BRs 120 having particular response terminal identifications, collect responses from only a sample, e.g. five percent, of those BRs 120 receiving the interactive application 115, or limit responses by time duration, e.g. only those BRs 120 receiving the interactive application 115 within five minutes after the start of a program, or any combination of these or other limiting factors. In a preferred embodiment of the present invention, the response parameters are coded into the interactive application 115 prior to it being transmitted to the BR 120. In alternative embodiments, the BRs 120 themselves determine whether to respond by using internally generated criteria. For example, the interactive application 115 can specify that only five percent of the BRs 120 receiving the interactive application 115 generate TV responses. Accordingly, each BR 120 would generate a random number, or use another selection criteria, and determine whether it is in the responding group.

The broadcaster 114 can also control the preferred response path. For example, the broadcaster 114 can determine whether the responses are stored for later forwarding to the LDC 122 or whether the responses are sent as soon as possible. If the amount of data in the response packet exceeds the amount which may be sent using the preferred response path, e.g., the cable system, the BR 120 may be configured to contact the LDC 122 using an alternate response path, e.g., a telephone call.

Once the interactive application 115 is developed, it is transmitted 413 to the interactive application database 112 in the broadcast server 110. The broadcaster sets the broadcast schedule 412 for the interactive application 115 and provides 414 the schedule to the broadcast server 110 in, for example, the form of a playlist. As described with respect to FIG. 1, the interactive application 115 is retrieved from the database and inserted 416 into the broadcast feed at the scheduled time or times.

Those BRs 120 tuned to the channel on which the interactive application 115 is broadcast at the same time it is broadcast 416 receive the application. In alternative embodiments, the application is broadcast to all BRs 120 receiving the transmission, regardless of the channel to which the BR 120 is tuned or whether the BR 120 is currently in use. For example, in such an embodiment the BR 120 may silently monitor one or more special channels for interactive applications.

The interactive application 115 is preferably launched automatically upon receipt by the BR 120. Once launched, the application collects 418 the usage information for which it is programmed by storing information in a storage device 212 indicating the monitored attributes. The interactive application 115 then prepares a response packet containing the collected and stored information for eventual transmission 420 to the LDC 122.

As described above, usage information that can be collected by the interactive application 115 generally falls into three categories: information about the program, information about the BR 120, and information about an interactive application executing on the BR 120. To determine information about the program, one embodiment determines whether the program is being viewed by continuously broadcasting the interactive application 115 during the program. The application, when executed, creates a response packet indicating that the tuner is tuned to the program. To determine how long a program is viewed, one embodiment continuously broadcasts the application during the program. When the application is executed, it records the time it was launched and, when the show ends, the channel is changed, or the BR 120 is turned off, the application calculates the total viewing time and records a response so indicating. This latter application may be modified to provide viewing start and stop times by starting a timer when the viewer tunes to the channel and recording a response with the timer's value when the viewer leaves the channel. When determining the viewer's entry path to the channel, the interactive application 115 may record whether the BR 120 was on the channel before the program began, tuned to the channel during a show or advertisement, turned on during the program, or whether an upstream tuner (i.e., a tuner receiving the signal ahead of the BR 120, such as a VCR coupled to the cable ahead of the set-top box) was tuned to the channel during the program. One embodiment sets a bit in the interactive application 115 during only the first five seconds of the program. If the response indicates that this bit was set, it can be determined that the tuner was on the channel at the start of the program. When determining the viewer's exit path from the channel, the interactive application 115 may record whether the program ended, whether the BR 120 was tuned to another channel or turned off, or whether an upstream tuner was tuned to another channel during the program. In addition to the program information gathered above, the interactive application 115 may also gather the same information on a per-channel, per-multiple channel, or per-network basis.

In one embodiment, the interactive application 115 generates a response indicating a confidence level that the television 218 is actually on the channel indicated by the BR 120. For example, the interactive application 115 may determine that an upstream tuner is being used to control channel selection because the television 218 is always tuned to channel three. Accordingly, the interactive application 115 would indicate that the channel information has a low confidence level.

As mentioned above, information about the BR 120 which can be tracked includes use of picture-in-picture, video inputs, tuner, mute, closed-captioning, and stereo surround, and the like. One embodiment of the BR 120 records this information by storing information in memory 212 each time one of the features is used.

Information about an interactive application can be tracked by having the application record when it is launched and the order in which forms in the application were viewed or used by setting one or more bits in the response packet. The application can also use a timer to record the time spent on each form. In one embodiment, as each form is entered, the application records in an array the time which was spent on the previous form, and then resets the timer to record time spent on the current form. The timer is preferably stopped when an application is suspended, so commercial breaks will not interfere with accurate timing. In one embodiment, a "suspend" timer is set to limit the time that an application is suspended. Accordingly, the application will not be suspended indefinitely when the channel is changed during a commercial. In another embodiment, the application uses the real-time clock to record the time of form entry or exit. The entry path to and exit path from the application can also be captured and provided to the application for inclusion in a response packet.

FIG. 5 is a chart illustrating an embodiment of the response packet 500 generated by the BR 120 and transmitted to the LDC 122. The response packet 500 is divided into separate fields, each representing a bit or bits in the response packet. FIG. 5 shows only one embodiment of the response packet 500 and the size, type, and order of the fields may vary.

The Version Number field 510 identifies the version number of the transmission protocol. This field is used by the LDC 122 to ensure that the BR 120 is using the same transmission protocol as the LDC 122. The Type field 512 identifies the type of response information included within the response packet. In one embodiment, the type field 512 specifies whether the packet contains usage monitoring information about a program, the BR 120, and/or an interactive application.

The Free Memory field 514 indicates the amount of memory free in the first storage device 212 and may be used for error checking purposes. The Sample Size field 516 indicates the sampling size used by the interactive application 115. As described above, the BR 120 may also be configured to respond only if it should be included within the sample.

The Information field 518 includes the usage monitoring 520, broadcast receiver 522, and form visitation 524 subfields and contains the information collected by the interactive application 115 from the BR 120. Any or all of these subfields may contain information, depending upon the data collected by the interactive application 115. The usage monitoring subfield 520 may contain subfields identifying the channel monitored, the amount of time the channel was viewed, the entry and exit channels, and other information as may be specified in the interactive application 115. The reception terminal subfield 522 preferably contain subfields identifying the various BR 120 features and their settings and/or frequency of use. The form visitation subfield may contain subfields identifying the number of forms viewed, the final form viewed, the number of visits per form, and the number of seconds spent at each form. For those fields containing time-stamped data, one embodiment uses the number of seconds or minutes that have elapsed from a predetermined date, e.g. the number of seconds past Jan. 1, 1970 at 12:00 am UTC to represent the recorded time. However, the format of the time data may be specified by the interactive application 115 or the compact protocol.

The response packet 500 preferably also contains a field 526 for application specific data. The LDC 122 may determine how to parse this field 526 from the data in the type field 512 or from data in the interactive application identification field 528, which identifies the interactive application that generated the response packet 500. The packet 500 also preferably includes a BR identification field 530 that contains the terminal identification code of the specific BR 120 that generated the response. This field 530 can be used to identify the subscriber generating the response as well as the make and model of the BR. In addition, the packet 500 preferably includes a broadcast server identification field 532 that contains the identification of the broadcast server 110 that transmitted the interactive application 115.

As described above, the packet 500 may be sent via the cable headend, a telephone connection, or other transmission means. By using the BR identification field 530, the LDC 122 can cross-reference responses received from the BR 120 and stored in the response database 124 with subscriber information stored in the subscriber information database 126. For each subscriber, the subscriber information database 126 preferably includes the terminal identification code of the subscriber's BR 120, a unique subscriber identification number, the subscriber's name, address, ZIP code, and phone number, products or classes of products purchased by the subscriber, the subscriber's income, age, race, viewing habits or preferences, and any other information needed for billing purposes or gathered by, for example, subscriber surveys.

Referring again to FIG. 4, this cross-referenced information is aggregated 422 with the received response to form an aggregated response. Then, the multiple aggregated responses generated by the LDC 122 are preferably combined. In one embodiment, the identification of the specific BR 120 that generated each response is stripped from the combined responses. The combined and aggregated responses may, for example, provide indications of the number of viewers who watched a particular channel, the average income and age of those viewers, and the geographic locations of those viewers.

The aggregated and combined responses generated by the LDC 122 are preferably transmitted 424 to the MDC 128, where they are held in the aggregate response database 130. This database 130 combines the responses received from the various LDCs to which the MDC 128 is coupled. In one embodiment, the MDC 128 further aggregates the responses with additional subscriber information stored in a MDC subscriber information database (not shown). The MDC 128 also uses the received playlist 113 to correlate the aggregated responses with the broadcast programs and determine the precise program or event that was transmitted when the response was generated, thereby providing aggregated response data for that particular program. For example, the MDC 128 can determine from the playlist 113 that a commercial was broadcast on a particular network at a particular time. By analyzing the times that the responses in the response database 130 were generated, the MDC can determine how many subscribers were viewing the commercial at that time and the subscribers' average income.

Finally, the MDC 128 generates a report from the data contained in the aggregated responses. In general, the broadcaster 114 specifies the type of report it wishes to receive. Such a report may indicate, for example, the total rating or share of a broadcast, the average age of subscribers who watched a program at specific instants in the program, the subscribers' entry and exit paths to and from the program, the average income of the subscribers who watched the program, or any other geographic, demographic, or psychographic profiles of the subscribers that can be developed from the aggregate responses. Preferably, the exact identities of the individual subscribers are stripped from the report in order to protect the subscribers' privacy.

In one embodiment, the MDC 128 uses the interactive application identification fields 528 in the response packets to determine the broadcaster 114 whose interactive application generated the response. The MDC 128 determines the type of report requested by the broadcaster 114 from a data store, and then generates the report from the responses. Reports are preferably automatically and electronically delivered to the requesting broadcasters using, for example, electronic data interchange methods such as a secure web page, an electronic mail attachment using the Multipurpose Internet Mail Extensions protocol, the File Transfer Protocol, or push-based technology. In some embodiments, the reports are plain text files, while in others the reports are rich text files in, for example, the ADOBE ACROBAT portable document format, while in still others the reports are multimedia documents in, for example, the HTML format.

Figure 6A:
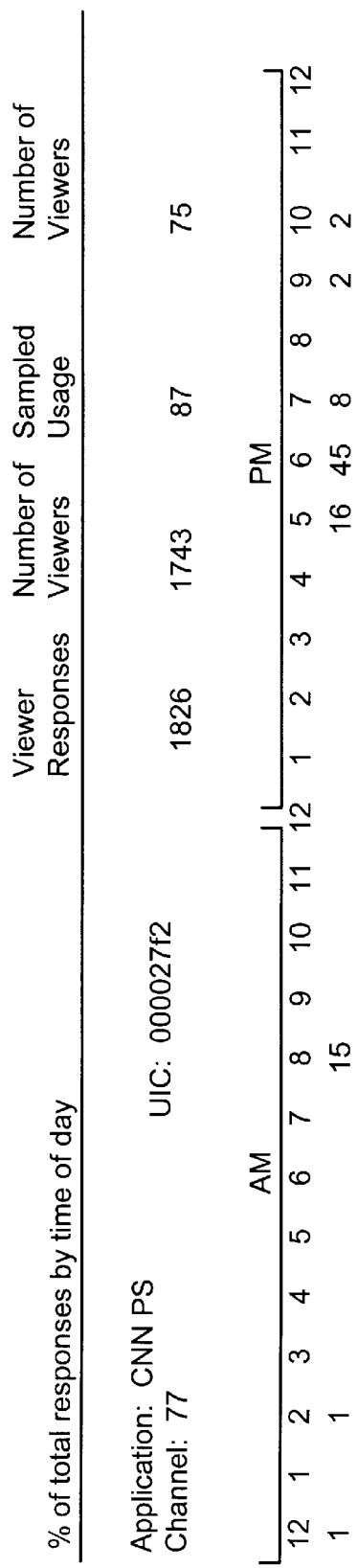
FIG. 6 illustrates sample reports that may be generated by the master data center from the aggregate responses.

FIG. 6 illustrates sample reports that may be generated by the MDC 128 from the aggregate responses. FIG. 6A illustrates a sample report showing the percentage of total responses received in a particular geographic market for a particular channel by time of day. One channel, 77, is shown in the report and it carries a broadcast feed provided by the CABLE NEWS NETWORK ("CNN"). Channel 77 executed a monitoring interactive application entitled "CNN PS" and having an interactive application identification of 000027f2 (shown in the report as a "UIC"). As shown in FIG. 6A, a total of 1826 viewer responses were received from 1743 different viewers on the reported day. Eighty seven of these responses from 75 different viewers were generated by the CNN PS application and indicate subscribers who triggered the CNN PS application by watching channel 77. As shown by the timeline corresponding to channel 77 in the report, 15 responses were generated at approximately 8 A.M. while 69 responses were generated between approximately 5–7 PM. Accordingly, these responses indicate that a majority of viewers watched channel 77 in the typical breakfast and dinner hours.

FIG. 6B, in contrast, is a report illustrating daily form usage for a particular interactive application on channel 36 in a particular geographic area, Orlando, Fla. In FIG. 6B, channel 36 carries a broadcast feed provided by CNN. The interactive application carried with the feed has three associated root forms, Headline News, National News, and World News, and each root form has additional forms that may be displayed through the root form. For each form, the first number after the form name indicates the average time in seconds spent on that form and the second number of the form name indicates the number of visits recorded for that form. For example, the form entitled "Headline News" had 16 visits, but the average time of visitation was less than a second. The associated form "Headline News-More Detail, Story 1" had a total of 45 visits and an average of 23 seconds per visit.

In summary, the present invention is a system and method allowing configurable monitoring of program viewership, broadcaster receiver usage, and interactive application usage. By collecting responses produced by interactive applications executing on broadcast receivers, the system and method can provide very specific reports of viewership and usage. In addition, the system and method can cross-reference received responses with subscriber information to provide reports including demographic and psychographic information about responding subscribers.

We claim:

1. A method of selectively monitoring subscriber usage of a subset of a plurality of broadcast receivers, which subset is less than the plurality of broadcast receivers, the method comprising the steps of:

receiving at the plurality of broadcast receivers an interactive application accompanying a broadcast program;

executing the interactive application at each broadcast receiver to selectively determine which broadcast receivers will be included in the subset of broadcast receivers for selectively monitoring subscriber usage;

responsive to the determination, configuring the subset of broadcast receivers to monitor specified selected attributes indicative of subscriber usage; and storing data in the subset of broadcast receivers indicative of the monitored attributes.

2. The method of claim 1, further comprising the steps of:

combining the stored data indicative of the monitored attributes from the subset of broadcast receivers; and generating a report from the combined stored data describing the monitored attributes of the subset of broadcast receivers.

3. The method of claim 1, further comprising the steps of:

specifying the selected attributes of the subset of broadcast receivers to be monitored by the interactive application;

storing within the interactive application program logic indicative of the selected attributes to be monitored; and transmitting the interactive application to the subset of broadcast receivers.

4. The method of claim 3, wherein the selected attributes of the broadcast receivers to be monitored include program viewership attributes.

5. The method of claim 3, wherein the selected attributes of the broadcast receivers to be monitored include interactive application usage attributes.

6. The method of claim 3, wherein the selected attributes of the broadcast receivers to be monitored include broadcast receiver usage attributes.

7. The method of claim 1, further comprising the steps of:

determining when the broadcast program accompanying the interactive application will be transmitted on a broadcast feed; and inserting the interactive application into the broadcast feed substantially contemporaneous with the transmission of the broadcast program.

8. The method of claim 1, further comprising the step of:

transmitting the stored data indicative of the monitored attributes from the broadcast receivers to a central database.

9. The method of claim 8, wherein a subset of broadcast receivers transmit stored data to the central database and further comprising the steps of:

aggregating the stored data indicative of the monitored attributes with subscriber information describing a subscriber with which the particular broadcast receiver that transmitted the stored data is associated; and generating a report from the aggregated stored data and subscriber information describing the monitored attributes of the broadcast receiver and associated subscriber information.

10. A system for selectively monitoring subscriber usage of a subset of a plurality of broadcast receivers, which subset is less than the plurality of broadcast receivers, comprising:

a broadcaster for providing broadcast data including an interactive application for selectively monitoring subscriber usage;

a plurality of broadcast receivers receiving the broadcast data from the broadcaster and each broadcast receiver having a memory for storing the interactive application for selectively monitoring and an engine for extracting the interactive application from the broadcast data, executing the interactive application to determine a subset of the plurality of broadcast receivers for monitoring subscriber wage, and generating a response describing subscriber usage for each broadcast receiver in the subset of broadcast receivers; and a data center for receiving responses generated by the subset of broadcast receivers executing the interactive application for selective monitoring and generating a report describing subscriber usage of the responding broadcast receivers.

11. The system of claim 10, wherein the broadcaster comprises:

a broadcast server having a stored plurality of interactive applications including the interactive application for selective monitoring and receiving a playlist describing programs broadcast on a broadcast feed for retrieving particular ones of the stored plurality of interactive applications response to the playlist; and a data insertion unit receiving the broadcast feed and the retrieved interactive applications from the broadcast server for inserting the received interactive applications into the broadcast feed to create the broadcast data.

12. The system of claim 11, wherein the data insertion unit inserts the interactive applications into the vertical blanking interval of the broadcast feed.

13. The system of claim 10, wherein the data center comprises:

a response database for holding the responses generated by the subset of broadcast receivers; and subscriber information database for holding information about subscribers having ones of the subset of broadcast receivers and information for cross-referencing the subscribers with the responses generated by the subset of broadcast receivers.

14. The system of claim 13, wherein the data center generates a report including information from the subscriber information database describing the subscribers having responding broadcast receivers.

15. The system of claim 10, further comprising:
a plurality of data centers each for receiving and aggregating responses generated by a geographically related subset of the plurality of broadcast receivers; and
a master data center for receiving and further aggregating the aggregate responses from the plurality of data centers and generating a report therefrom describing the responding broadcast receivers.

16. The system of claim 10, wherein the broadcast receivers receive the broadcast data from the broadcaster and transmits responses to the data center via a single transmission medium.

17. The system of claim 10, wherein the subset of broadcast receivers receive the broadcast data from the broadcaster via a first transmission medium and transmit responses to the data center via a second transmission medium different than the first transmission medium.

18. A method of generating a usage report describing a subset of a plurality of remote broadcast receivers, which subset is less than the plurality of broadcast receivers, receiving a broadcast feed from a broadcaster, the method comprising the steps of:
defining an interactive application specifying characteristics of the subset of remote broadcast receivers to be monitored;
transmitting the interactive application with the broadcast feed to a plurality of remote broadcast receivers;
executing the interactive application at each broadcast receiver to determine a subset of the plurality of broadcast receivers to generate responses;
responsive to the determinations, configuring the subset of remote broadcast receivers to generate responses describing the specified characteristics to be monitored;
transmitting the responses from the subset of remote broadcast receivers to a data center; and
generating a report from the responses received by the data center, the report describing usage of the monitored characteristics of the subset of remote broadcast receivers.

19. The method of claim 18, wherein the step of transmitting the interactive application with the broadcast feed to the subset of remote broadcast receivers comprises the step of:
inserting the interactive application into a vertical blanking interval of the broadcast feed.

20. The method of claim 18, wherein the step of transmitting the interactive application with the broadcast feed to the subset of remote broadcast receivers comprises the steps of:
retrieving die interactive application from an interactive application database responsive to the broadcasting on the broadcast feed of a program associated with the interactive application; and
inserting the retrieved interactive application into the broadcast feed substantially concurrent with the broadcast of the associated program.

21. The method of claim 18, wherein the defining step further comprises the step of:
defining the interactive application to monitor viewership characteristics of the subset of remote broadcast receivers.

22. The method of claim 18, wherein the defining step further comprises the step of defining the interactive application to monitor characteristics of a second interactive application executed by the subset of remote broadcast receivers.

23. The method of claim 18, wherein the step of transmitting the responses from the subset of the remote broadcast receivers to a data center comprises the step of:
transmitting the responses responsive to an occurrence of a triggering event.

24. The method of claim 23, wherein the triggering event is specified by the interactive application.

25. The method of claim 18, wherein the generating step comprises the steps of:
aggregating each received response with subscriber information describing a subscriber who generated the response; and
describing the subscriber information in the report.

26. A method of monitoring program viewership in a television program delivery system having a plurality of broadcast receivers, the method comprising the steps of:
receiving at each broadcast receiver an interactive application, the interactive application configured to monitor selected attributes of particular ones of the plurality of broadcast receivers;
executing the interactive application at each broadcast receiver to determine a subset of the plurality of broadcast receivers for monitoring specified selected attributes, which subset is less than tile plurality of broadcast receivers; and
responsive to the determination, monitoring the selected attributes of the subset of broadcast receivers.

27. A computer-readable medium having store thereon instructions which, when executed by a processor in a broadcast receiver, cause the processor to perform the steps of:
executing an interactive application to determine if the broadcast receiver is one of a subset of a plurality of broadcast receivers for monitoring specified selected attributes, which subset is less than the plurality of broadcast receivers; and
responsive to the determination, monitoring the selected attributes of the broadcast receiver.

28. A computer-readable medium having store thereon instructions which, when executed by a processor in a broadcast receiver, cause the processor to perform the steps of:
executing an interactive application to determine if the broadcast receiver is one of a subset of a plurality of broadcast receivers for monitoring specified selected attributes, which subset is less than the plurality of broadcast receivers;
responsive to the determination, configuring the broadcast receiver to monitor specified selected attributes; and
storing data in the broadcast receiver indicative of the monitored attributes.

29. A broadcast receiver for selectively monitoring program viewership in a television program delivery system comprising:
means for receiving an interactive application accompanying a broadcast program;
means for executing the interactive application to selectively determine if the broadcast receiver is one of a subset of a plurality of broadcast receivers for monitoring specified selected attributes, which subset is less than the plurality of broadcast receivers;
means for configuring the broadcast receiver to monitor the specified selected attributes in response to said determination; and
means for storing data in the configured broadcast receiver indicative of the monitored attributes.

* * * * *

UNITED STATES PATENT AND TRADEMARK OFFICE
CERTIFICATE OF CORRECTION

PATENT NO.    : 6,530,082 B1                                         Page 1 of 1
DATED         : March 4, 2003
INVENTOR(S)   : Eric E. Del Sesto et al.

It is certified that error appears in the above-identified patent and that said Letters Patent is hereby corrected as shown below:

<u>Column 18,</u>
Line 36, change "wage" to -- usage --;

<u>Column 19,</u>
Line 52, change "die" to -- the --;

<u>Column 20,</u>
Line 24, change "tile" to -- the --;
Line 49, after "monitor" insert -- the --.

Signed and Sealed this

Twenty-first Day of October, 2003

JAMES E. ROGAN
*Director of the United States Patent and Trademark Office*